March 1, 1955 F. S. MALICK 2,703,379
ELECTRONIC CONTROL SYSTEM FOR CONTROLLING THE OPERATION
OF ELECTRIC MOTORS AND SIMILAR ELECTRIC LOADS
Filed Feb. 21, 1948
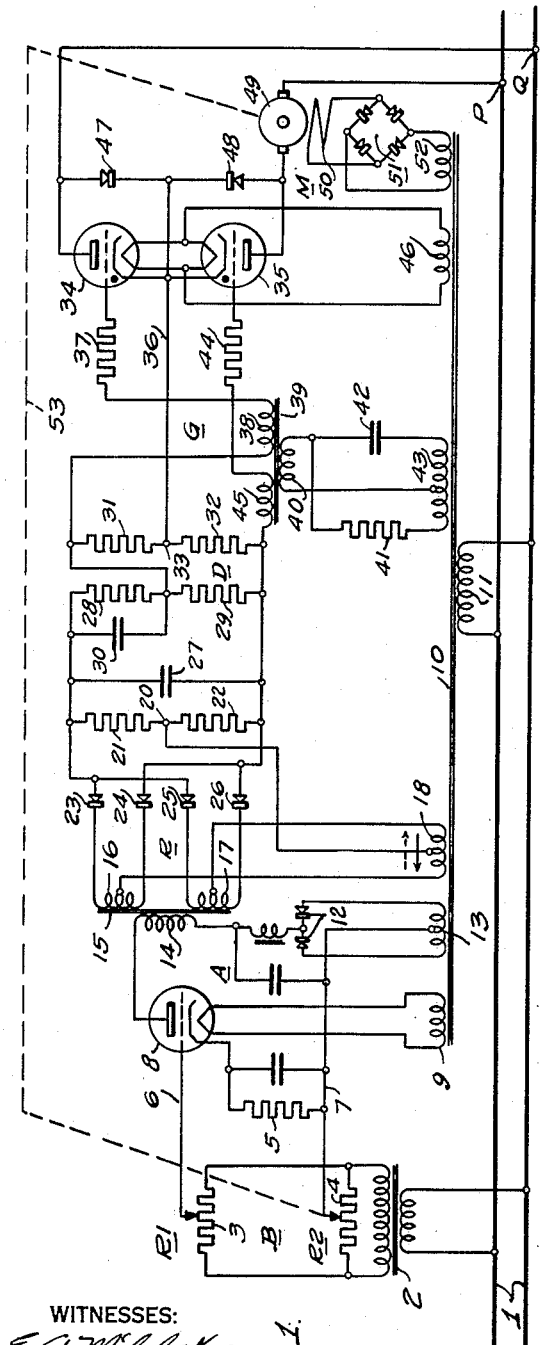
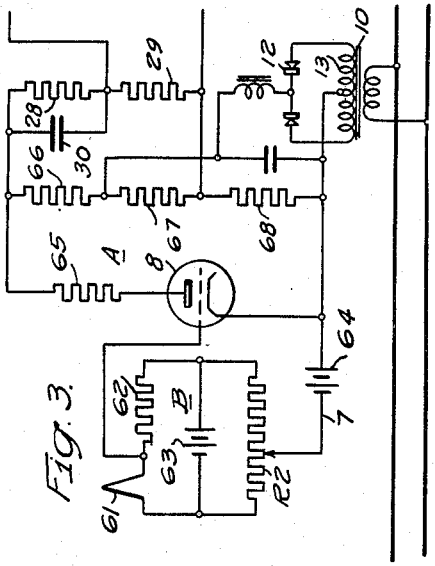
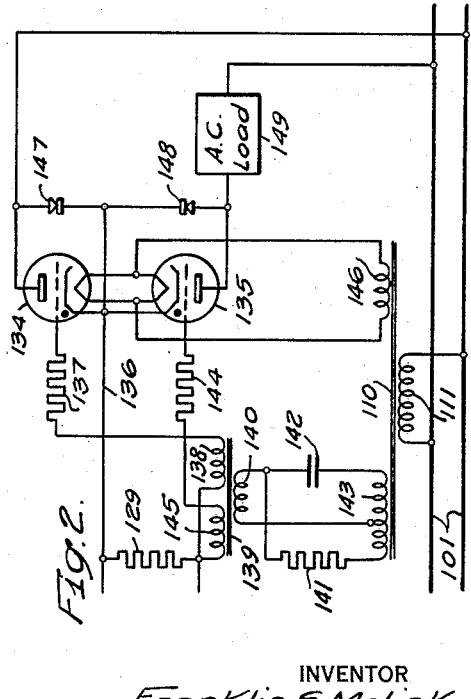
WITNESSES:
INVENTOR
Franklin S. Malick.
BY
ATTORNEY

United States Patent Office 2,703,379
Patented Mar. 1, 1955

2,703,379

ELECTRONIC CONTROL SYSTEM FOR CONTROLLING THE OPERATION OF ELECTRIC MOTORS AND SIMILAR ELECTRIC LOADS

Franklin S. Malick, Wilkinsburg, Pa., assignor, by mesne assignments, to the United States of America as represented by the Secretary of the Navy Application February 21, 1948, Serial No. 10,008

9 Claims. (Cl. 318—29)

My invention relates to electronic control systems in which trigger tubes such as thyratrons control the energization of a load from an alternating-current source.

It is an object of my invention to provide a control system of the type mentioned that can be designed with small dimensions and low weight so as to be especially favorable for use on aircraft or, generally, under conditions where space or weight are at a premium.

Another object of the invention is to devise a trigger tube control system in which the two tubes, for operation in alternate half-cycle periods of the energizing voltage, permit the use of a single filament or heater circuit with a single filament transformer, and in which the tubes are controlled by a single source of control voltage thus affording a simple and space saving design of the load controlling circuit elements.

It is among further objects of the invention to provide a control system of the mentioned type whose basic design lends itself readily for controlling either a direct current or an alternating-current load device and which can be used to advantage as a servo-mechanism, self-adjusting measuring bridge, or for various other purposes.

These and other objects, as well as the means provided by the invention for achieving them will be apparent from the following description in conjunction with the drawing in which:

Figure 1 is a circuit diagram of a system according to the invention including a direct-current motor;

Fig. 2 is a partial circuit diagram showing a modified load circuit for operating an alternating-current load; and Fig. 3 illustrates a modified control circuit applicable in control systems otherwise similar to those of Figs. 1 and 2.

The control system illustrated in Fig. 1 is designed as a position-control servo-mechanism of minimum size and weight for driving a potentiometer in an airborne ballistic computer by means of a miniature direct current motor. In order to present a complete and detailed description of the illustrated embodiment, numerical values and commercial type designations of circuit elements will hereinafter be given by parenthetical references, all referring to the just-mentioned application of the invention. It should be understood, however, that these values and type designations are given merely for the purpose of exemplification and that other numerical ratings and types of circuit elements may be used depending upon the requirements or desiderata of each particular application.

In Fig. 1, the direct current motor M to be controlled is mechanically connected to the device to be positioned (not shown). The operation of the motor, as regards direction and extent of rotation, is controlled by a control potentiometer R1 so that the motor M will run one way when the potentiometer slider is displaced in one direction and the other way when the adjustment of the potentiometer slider is in the other direction. In order to secure an automatic followup performance, the system is equipped with a reference potentiometer R2 whose slider is mechanically connected with the motor M. As a result, any change in adjustment of the potentiometer R1 causes the motor M to perform the desired positioning movement and also to move the potentiometer R2 in the direction required to nullify the control effect of the potentiometer R1. Consequently, the motor stops after it has executed the change in position called for by the change in adjustment of potentiometer R1.

More in detail, the system is energized from the leads of an alternating current line 1 of constant frequency (400 C. P. S., 110 volts). A transformer 2 connected to the line 1 provides alternating-current voltage for a balanceable bridge network B which includes the resistor 3 of control potentiometer R1 and the resistor 4 of reference potentiometer R2. The sliders of the two potentiometers R1 and R2 are connected to leads 6 and 7, respectively. When the positions of the two sliders relative to the respective resistors 3 and 4, are in agreement with each other, the bridge circuit is balanced so that there is no voltage difference between leads 6 and 7. When the slider of control potentiometer R1 is displaced from the balance position, an alternating control voltage is impressed across leads 6 and 7. This voltage has a magnitude proportional to the extent of the departure from positional agreement. When the displacement of the control rheostat slider is in one direction, the control voltage has a given phase position relative to the phase of the alternating voltage of line 1, and when the slider of the control rheostat is displaced in the opposite direction, the phase of the control voltage reverses, i. e. it is shifted 180° relative to the given phase position just mentioned.

Lead 6 is attached to the cathode and lead 7 to the grid of a vacuum tube 8 (type 6J6) which forms part of an amplifier circuit A. The cathode heater of tube 8 is energized from a secondary 9 of a power transformer 10 whose primary 11 is connected to the line 1. The plate circuit of tube 8 is energized by direct-current voltage (220 volts) obtained, for instance, through a filter circuit from rectifier 12 attached to another secondary 13 of transformer 10. The primary 14 of a coupling transformer 15 (migit audio transformer) is series connected in the plate circuit of tube 8. Tube 8 is biased by its cathode resistor 5 so that it operates as a class A amplifier. The alternating component of the current flowing in the primary 14 of transformer 15 has the same wave shape as the sine wave voltage applied between grid and cathode of tube 8. This current causes sine valve voltages to be induced in the secondary windings 16 and 17. The phase relation of these voltages with respect to the line voltage depends upon the direction of displacement of the slider in the control rheostat R1 relative to the slider position of rheostat R2.

The two secondaries 16 and 17 have each a tapped midpoint which is attached to the respective end points of a secondary winding 18 of transformer 10. Winding 18 has a tapped midpoint connected to a point 20 between two resistors 21 and 22 (each .1 megohm). The respective end points of these resistors are connected to the ends of the secondaries 16 and 17 through four rectifier units 23, 24, 25 and 26 (miniature germanium rectifiers). A filter capacitor 27 (.1 mf.) is connected across resistors 21 and 22. The secondaries 16 and 17 are connected in a mutually opposing sense. The secondaries 16 and 17, the rectifier elements 23, 24, 25, 26 and the resistors 21 and 22, together with the transformer winding 18, represent a phase-sensitive rectifier arrangement R whose output voltage appears across capacitor 27. The rectified output voltage has a polarity which depends upon the direction of the displacement of the slider in the control rheostat R1. That is, when the slider departs in one direction from positional agreement with the slider of rheostat R2, one terminal of the capacitor 27 is positive relative to the other, while when the slider in rheostat R1 is displaced the other way, the polarity of the rectified voltage is reversed. The reversal of polarity is due to the fact that the voltage induced in winding 18 of transformer 10 has always a fixed phase relation to the line voltage while the two mutually opposed voltages induced in the secondaries 16 and 17 of coupling transformer 15 change their respective polarities when the direction of slider displacement is changed. At any instant, the voltage of winding 18 cancels part of the voltages of windings 16 and 17 depending upon which of the two latter voltages is then in opposition to that of winding 18.

The just-mentioned reversible output voltage of the rectifier arrangement R is impressed across a resistor-capacitor network D composed of resistors 28 (.4 megohm) and 29 (.1 megohm), and a capacitor 30 (.1 mf.) connected in parallel with resistor 28. This network causes the voltage developed across resistor 29 to have a component proportional to the rate of change of the voltage across the capacitor 27. This provides damping desirable for the stabilization of the servo-system. The voltage drop taken from resistor 29 is impressed across two resistors 31 and 32 (each .1 megohm) with a common midpoint 33.

The resistors 31 and 32 form part of a grid circuit section G for two electronic trigger tubes 34 and 35, for instance, thyratrons (type 2D21). The two tubes have a common cathode lead 36 connected to a point 33 between resistors 31 and 32. The grid of tube 34 is connected in series with a resistor 37 (.1 megohm) and in series with the secondary 38 of a grid-circuit transformer 39 (midget audio transformer) to the outer terminal of resistor 31. The primary 40 of transformer 39 forms part of a phase shift circuit which includes a resistor 41 and a capacitor 42 and is energized from a tapped secondary 43 of the transformer 10. The grid of tube 35 is connected through a resistor 44 (.1 megohm) and another secondary 45 of transformer 39 with the outer terminal of resistor 32. It will be recognized that the grid circuit of tube 34 includes two series connected sources of grid voltage. The first source is represented by the secondary winding 38 and provides an alternating component grid voltage. The other source of voltage is represented by the resistor 31. It provides a direct-current component of grid voltage which is zero when the sliders of rheostats $R_1$ and $R_2$ are in positional agreement and assumes a finite unidirectional value of one or the other polarity depending upon the direction of relative slider displacement. The grid circuit of tube 35 is impressed by winding 38 with an alternating voltage component whose phase is in opposition to the alternating voltage of winding 45 and shifted 90 degrees with respect to the line voltage and a unidirectional voltage component is impressed on the grid circuit of tube 35 by resistor 32 in opposed polarity to the voltage across resistor 31. The tubes 34 and 35 have interconnected cathode heaters which are fed from a secondary 46 of the transformer 10. Connected across the tube 34 is a two-electrode rectifier 47, for instance, of the dry or contact type (selenium disc rectifier). The polarity of connection for rectifier 47 is opposed to that of the tube 34. A similar two-electrode rectifier 48 is connected across the tube 35, also with opposed polarity relative to the tube.

The load circuit to be controlled is connected across the line 1 (400 C. P. S., 110 volts) and includes the armature 49 of the direct current motor M in series with the two tubes 34 and 35. The field winding 50 of motor M receives constant excitation, for instance, from a rectifier 51 energized from a secondary 52 of the transformer 10. Motor M is mechanically connected to the slider of rheostate $R_2$ by a connection schematically indicated by a broken line 53.

The control system operates as follows.

Assuming that the sliders in rheostats $R_1$ and $R_2$ are in positional agreement so that no voltage is impressed between grid cathode of the amplifier tube 8, no voltage is induced in the secondaries of transformer 15, and the above-mentioned unidirectional components of the trigger tube grid voltage are zero. Under these conditions, the two trigger tubes 34, 35 are controlled only by the alternating component grid voltages so that the tubes become conductive in alternating cycle periods of the line voltage and each will fire at the same moment as the other relative to the respective half-cycle periods. Assume that in a given instant the point of the load circuit denoted by P is positive relative to the point denoted by Q. Then, current will flow from point P through armature 49 and tube 35, provided the tube is conductive at that moment. From the cathode of tube 35, the current flows through the rectifier 47 back to point Q. This flow of current lasts only during that portion of the half-cycle in which the tube 35 is conductive. During the next half-cycle and after the tube 34 becomes conductive, the current flows in the opposite direction, i. e. from point Q through tube 34, rectifier 48 and armature 49 back to point P. Consequently, the armature 49 receives current impulses of alternatively opposing directions and of equal amplitude and duration. The effects of these impulses balance each other so that the motor remains at rest. If the sliders of potentiometers $R_1$ and $R_2$ depart from positional agreement, the above-mentioned unidirectional component grid voltages across resistors 31 and 32 assume finite values of opposing polarities. As a result, the firing points of the trigger tubes become phase displaced in mutually opposing directions. Consequently, one tube will fire earlier within its proper half-cycle period and the firing of the other tube, relative to its proper half-cycle period, is delay. Now, the current impulses of alternately opposing polarities passing through the load circuit are unequal so that they no longer balance each other. The resultant effect on the armature 49 of motor M is that of a direct current energization whose average magnitude and polarity are determined by extent and direction of the slider displacement of the control rheostat. Hence, motor M will run one way or the other depending upon the change in position of the controlling slider. As mentioned, such movement of the motor effects the desired positioning or adjustment of the apparatus to be controlled and also moves the slider in the reference rheostat $R_2$ toward positional agreement with the slider of the control rheostat $R_1$. When the proper position is reached, the impulses passing through the load circuit are again balanced so that the motor stops.

Before discussing modifications and other applications of control systems according to the invention, some remarks concerning the above described servo-mechanism for small ballistic computers may illustrate some of the advantages of such a system.

The provision of dry rectifiers in the phase-detecting rectifier section R of the control network leads to a reduction in weight because of the elimination of the filament supply circuits necessary for tube type rectifiers. If desired, however, especially for applications other than the above-mentioned computers, the rectifiers 23, 24, 25, 26 may be replaced by tubes, such as two twin diodes. It will also be understood that while I prefer full-wave rectification, half-wave rectification may be sufficient for some purposes. To this end, one of the transformer windings 16 and 17 with the appertaining two rectifiers and the appertaining half of winding 18 may be omitted.

The common cathode circuit for the two trigger tubes 34 and 35 permits the use of a single source of control voltage for the control of both tubes and makes possible the use of a single filament transformer winding for both tubes. This results in an appreciable saving in weight as compared with known circuits comprising tubes in back to back connection. The provision of rectifiers of the dry or junction type, as represented by rectifiers 47 and 48, eliminates filament circuit and heating transformer which would be necessary if tube rectifiers were used. This also contributes to the desired reduction in weight and space requirements. For other applications of the invention, however, diodes may be applied instead of the dry rectifiers 47 and 48 and the filament heating circuits of these diodes may be energized with power from the same source (winding 46) as the thyratron heaters.

No isolating transformers are required between the current supply leads and the load circuit proper. This is another reason for the considerable reduction in weight and space obtained with the illustrated system.

The grid control is very smooth because there is no coupling between the grid and load circuits to distort the grid voltage wave form.

The provision of a direct current motor with a single field winding permits making maximum possible use of the space required for the motor for a given rating. In other words, since only one field winding and only one armature winding are needed, all of the material of the motor is active so that the motor can be made smaller than with a split field method of control where only one-half of the available winding material is active at a time. Another advantage of the system is that the thyratrons are controlled by a direct current voltage. This makes possible the stabilization of the servo-mechanism by use of the simplest possible type of error rate damping network comprising in Fig. 1 the resistors 28, 29 and the capacitor 30.

Systems according to my invention and largely similar to the design of the embodiment shown in Fig. 1 may also be used for controlling such alternating current loads as occurring in welding or heating equipment. This will be understood from the embodiment shown in Fig. 2 which represents only the load circuit with the trigger tubes and associated rectifiers and the appertaining grid circuits of the trigger tubes, all other elements and connections being assumed to be similar to those shown in Fig. 1.

According to Fig. 2, a resistor 129 is provided to impress on the grid circuits a unidirectional voltage drop of controllable magnitude and polarity. The resistor 129 may correspond to the resistor 29, or if a further division of voltage is desired, to either the resistor 31 or 32 of Fig. 1. That is, the resistor 129 represents the output element of a voltage divider which is energized from a phase-detecting rectifier arrangement similar to the one denoted by R in Fig. 1, and which may be controlled through an amplifier circuit A by a balanceable control network B, also as shown in Fig. 1. The two thyratrons 134 and 135 according to Fig. 2 have a common cathode lead 136 which is connected to one terminal of resistor 129. The grid of tube 134 is connected through a resistor 137 and the secondary 138 of a transformer 139 to the other terminal of resistor 129. The primary 140 of transformer 139 is energized in a phase shift circuit, including a resistor 141 and a capacitor 142, from a secondary 143 of a transformer 110 whose primary 111 is energized from the leads of the alternating current line 101. The grid of tube 135 is connected through a resistor 144 and another secondary 145 of transformer 139 to the same terminal of resistor 129 to which the grid circuit of tube 134 is connected. Two rectifiers 147 and 148 lie in parallel to the respective thyratrons 134 and 135 in the same manner as described above with reference to rectifiers 47 and 48 of Fig. 1. The load device 149 in the load circuit according to Fig. 2 is an alternating current device. It will be recognized that the circuit portions shown in Fig. 2 are similar to the corresponding portions of the system shown in Fig. 1 except that the two-tube grid circuits are connected to the same terminal of resistor 129 so that the direct current component of the grid voltage impressed on the two tubes 134 and 135 has the same polarity for both tubes and consequently affects the firing point of the tubes in the same sense.

When the circuit (see circuit B in Fig. 1) is balanced, the firing points of the two tubes 134 and 135 (Fig. 2) have a given position relative to the conductive half-cycle periods of the respective tubes. When the control rheostat is adjusted so that its slider departs from the balance position, the firing point in both tubes is shifted in the same direction relative to the respective half-cycle periods so that both tubes become more or less conductive depending upon the direction of slider displacement. In this manner the alternating current flowing through the load device 149 can be varied as desired.

I am aware of the fact, and it will be obvious to those skilled in the art that the invention permits various modifications, especially as regards the circuit elements for controlling the grid voltage of the two trigger tubes. The available modifications are too numerous to be all mentioned in detail. Some, however, will be referred to below in order to illustrate the adaptability and versatility of the invention.

Referring to Fig. 1, for instance, it will be recognized that the direct current component of grid voltage impressed on each trigger tube has a magnitude substantially proportional to the extent of departure of the control rheostat slider from the balance point. Consequently, not only the polarity of the average direct current effective in motor M but also the effective magnitude of this current is controlled by the control potentiometer. As a result, the speed of the motor M is the larger the farther the control rheostat slider is displaced from the balance position. This is of advantage in servo-mechanisms because it makes the characteristic of the system linear so that its performance can be calculated.

Systems according to the invention, such as the one shown in Fig. 1 and described above, can be used for any measuring, indicating, control or regulating purposes in which a bridge or the like balanceable in circuit controls the operation of a motor in response to a condition-responsive or otherwise variable unbalance voltage. The balanceable circuit may be composed of impedances other than those of the ohmic type, it may be energized by direct-current or the variable control member may be a device other than a rheostat, for instance, it may consist of a variable voltage source, to mention only some of the applicable modifications. Thus, the embodiment shown in Fig. 3, represents a system applicable for balancing a direct-current bridge or the line circuit for any of the above-mentioned purposes.

Fig. 3 shows only the bridge section B and amplifier section A of the modified system up to and including voltage-dividing resistors 28 and 29, which correspond to the respective resistors 28 and 29 in Fig. 1, the not-illustrated portion of the system being identical with the corresponding portion (G, M) of Fig. 1.

According to Fig. 3, the bridge network B includes a variable voltage gauge, here represented as a thermocouple 61, a fixed resistor 62 and a rheostat R2 whose slider is mechanically connected with the reversible motor (not shown in Fig. 3). The bridge is energized by direct current from a source 63. The bridge output leads 6 and 7 are attached to grid and cathode respectively of amplifier tube 8.

A source of constant bias voltage is denoted by 64. The plate circuit of tube 8 includes resistors 65, 66, 67, 68 and is energized through rectifiers 12 from the secondary 13 of a transformer 10 connected to the line 1. Resistors 28, 29 and a capacitor 30 are arranged in the same manner as the correspondingly designated elements of Fig. 1.

If in the system of Fig. 3 the voltage of gauge 61 has a value at which the network B is balanced, the motor M (see Fig. 1) stops. Any change in gauge voltage unbalances the bridge and causes one or the other thyratron to fire thus controlling the motor to run in the direction required to rebalance the bridge substantially as described above with reference to Fig. 1.

If in systems according to the invention no followup connection is provided between the reference rheostat and the motor, the operation of the motor depends only on the position of the slider of the control rheostat R1 (Fig. 1) relative to a fixed reference point or only on the value of the gauge voltage (Fig. 3). Hence, a system according to the invention, thus modified, is applicable for general control or regulating purposes not requiring a self-adjusting or servo-motor performance. It is then also possible to give the control circuit B a simple potentiometric design, for instance, so that the circuit is non-balanceable and its output voltage merely amplitude-controlled but not phase-reversible.

The above-mentioned modifications will suffice to show that the invention is not limited to the embodiments specifically described in the foregoing but can be embodied in apparatus other than those exemplified, without departing from the essential features of my invention set forth in the claims annexed hereto.

I claim as my invention:

1. An electronic control system, comprising alternating-current supply means, a direct-current load device, two thyratron tubes having a common cathode lead and being connected in series opposition with each other and in series with said load device to said current supply means, two two-electrode rectifiers having respective anodes connected with said lead and being each connected across one of said tubes respectively, each of said tubes having a grid circuit, a pair of series-connected impedance members having a common point connected to said lead, a control network having an output circuit connected across said pair of impedance members for imposing thereon a controllable voltage, said grid circuits including said respective impedance members to cause said tubes to conduct within alternating half cycle periods of the alternating current during respective intervals whose ratio depends upon said voltages, said network having control means for varying said voltages, whereby said load device is provided with an average direct current whose magnitude is controlled by said control means.

2. An electronic control system, comprising alternating-current supply means, a load circuit connected to said current supply means to receive energization therefrom, two electronic trigger tubes each having an anode and a cathode and a grid circuit, said two tubes having their cathodes connected with each other and being connected in said load circuit in series opposed relation to each other, two two-electrode rectifiers each being connected across anode and cathode of one of said respective tubes with opposed polarity relative to said tube, a potentiometric circuit connected with said supply means and having a balanceable branch for providing a phase reversible control voltage of the same frequency as that of the current supplied by said means, said circuit having an adjustable circuit member for varying said control voltage, a circuit coupling member primarily connected to said circuit and having two secondary terminals and a secondary tap point between said terminals, a rectifier circuit having an impedance member with two terminals connected to said respective terminals of said coupling member and having two rectifiers interposed between said impedance terminals and said respective terminals of said coupling member with such polarities as to conduct in alternate half wave periods, a coupling member connected to said current supply means for providing a reference voltage of fixed phase relation to that of said supply means, said impedance member having a tap point intermediate said appertaining terminals, said coupling member being connected between said two tap points to impress said reference voltage on said rectifier circuit so that said impedance member is impressed by rectified voltage of reversible polarity depending upon the phase of said control voltage, and circuit means connecting said two grid circuits to said impedance member for varying the respective firing points of said trigger tubes in a given relation to each other under control by said rectified voltage.

3. An electronic control system, comprising alternating-current supply means, a load circuit connected to said current supply means to receive energization therefrom, two electronic trigger tubes each having an anode and a cathode and a grid circuit, said two tubes having their cathodes connected with each other and being connected in said load circuit in series opposed relation to each other, two two-electrode rectifiers each being connected across anode and cathode of one of said respective tubes with opposed polarity relative to said tube, a balanceable circuit connected to said supply means and having an output branch and variable circuit means for controlling the balance condition of said branch to impose thereon a phase-reversible control voltage, a rectifier coupled with said circuit branch to be impressed by voltage of reversible phase depending upon the phase condition of said control voltage, coupling means connecting said rectifier circuit with said supply means for impressing on said rectifier circuit another voltage of fixed phase relation to that of said supply means whereby the rectifier circuit provides rectified voltage of reversible polarity depending upon the pase condition of said control voltage, and circuit means connecting said two grid circuits to said rectifier circuit for varying the respective firing points of said trigger tubes in a given relation to each other under control by said rectified voltage.

4. An electronic control system, comprising alternating-current supply means, a load circuit connected to said current supply means to receive energization therefrom, two electronic trigger tubes each having an anode and a cathode and a grid circuit, said two tubes having their cathodes connected with each other and being connected in said load circuit in series opposed relation to each other, two two-electrode rectifiers each being connected across anode and cathode of one of said respective tubes with opposed polarity relative to said tube, a bridge circuit having an input diagonal connected to said supply means to be energized by alternating voltage and having an output diagonal and a potentiometric adjusting member for impressing on said output diagonal a phase reversible control voltage, an amplifier having an input circuit connected to said output diagonal, a rectifier circuit connected to said amplifier to be impressed by voltage of reversible phase depending upon the phase condidition of said control voltage, coupling means connecting said rectifier circuit with said supply means for impressing on said rectifier circuit another voltage of fixed phase relation to that of said supply means whereby the rectifier circuit provides rectified voltages of reversible polarity depending upon the phase condition of said control voltage, and circuit means connecting said two grid circuits to said rectifier circuit for varying the respective firing points of said trigger tubes in a given relation to each other under control by said rectified voltage.

5. An electronic control system, comprising alternating-current supply means, a load circuit connected to said current supply means to receive energization therefrom, two electronic trigger tubes each having an anode and a cathode and a grid circuit, said two tubes having their cathodes connected with each other and being connected in said load circuit in series opposed relation to each other, two two-electrode rectifiers each being connected across anode and cathode of one of said respective tubes with opposed polarity relative to said tube, a balanceable circuit connected to said supply means and having an output branch and variable circuit means for controlling the balance condition of said branch to impose thereon a phase-reversible control voltage, a rectifier coupled with said circuit branch to be impressed by voltage of reversible phase depending upon the phase condition of said control voltage, coupling means connecting said rectifier circuit with said supply means for impressing on said rectifier circuit another voltage of fixed phase relation to that of said supply means whereby the rectifier circuit provides rectified voltage of reversible polarity depending upon the phase condition of said control voltage, a series-connection of two resistors attached to said rectifier circuit, said interconnected cathodes of said tubes being attached to a point between said two resistors, and said two grid circuits including said respective resistors so that the firing points of said tubes are displaceable in opposing senses relative to the respective conductive half-cycle periods of said tubes under control by the respective voltage drops caused by said rectifier voltage across said two resistors.

6. An electronic control system, comprising alternating-current supply means, a load circuit connected to said current supply means to receive energization therefrom, two electronic trigger tubes each having an anode and a cathode and a grid circuit, said two tubes having their cathodes connected with each other and being connected in said load circuit in series opposed relation to each other, two two-electrode rectifiers each being connected across anode and cathode of one of said respective tubes with opposed polarity relative to said tube, a balanceable circuit connected to said supply means and having an output branch and variable circuit means for controlling the balance condition of said branch to impose thereon a phase-reversible control voltage, a rectifier coupled with said circuit branch to be impressed by voltage of reversible phase depending upon the phase condition of said control voltage, coupling means connecting said rectifier circuit with said supply means for impressing on said rectifier circuit another voltage of fixed phase relation to that of said supply means whereby the rectifier circuit provides rectified voltage of reversible polarity depending upon the phase condition of said control voltage, a resistor connected to said rectifier circuit, said interconnected cathodes of said tubes being connected to a point of said resistor, and said grid circuit being connected to another point of said resistor to be impressed by voltage drop caused by said rectified voltage between said two points in order to control the phase positions of the firing points of said tubes in the same sense relative to the respective conductive half-cycle periods of said tubes.

7. An electronic control system, comprising a direct-current motor to be controlled, an alternating-current circuit connected to said motor and having two thyratron tubes arranged in series-opposed relation to each other, said tubes having a common cathode lead and having respective grid circuits, two junction type rectifiers connected across said respective tubes each with opposed polarity relative to the appertaining tube, two series-connected resistors having a common midpoint connected to said cathode lead and having two respective terminals connected to said grid circuits, and a network connected across said two resistors and having a direct current source for impressing a voltage across said series-connected resistors, and adjustable circuit means for controlling said voltage in polarity and magnitude.

8. An electronic control system, comprising a direct-current motor to be controlled having an armature member and a field member, direct current means connected to one of said members, alternating current leads connected to said other member, two thyratron tubes having a common cathode lead and separate grid circuits and being interposed in series-opposed relation to each other between said leads and said other member, two junction type rectifiers connected across said respective tubes each with opposed polarity relative to the appertaining tube, a series-connection of two resistors having a midpoint connected to said cathode lead and having two terminals connected to said respective grid circuits, a bridge circuit connected to said leads to be energized by alternating current and having two rheostats with respective slide contacts and an output branch extending between said slide contacts to provide a phase-reversible control voltage depending upon the direction of departure of said slide contacts from positional agreement with each other, one of said slide contacts being mechanically connected to said motor armature, rectifying means having an output circuit coupled with said output branch and also with said leads to provide rectified voltages of a polarity determined by the phase condition of said control voltage, said series-connection of resistors being connected to said rectifying means to be impressed by said rectified voltage, whereby said motor is caused to run in the direction and to the extent required to place said one slide contact into positional agreement with said other contact.

9. An electronic control system, comprising alternating-current supply leads, a control network having a balanceable circuit with an output branch and an adjustable circuit member, said circuit being connected to said leads to provide said branch with phase-reversible control voltage under control by said circuit member, a coupling transformer primarily connected to said network to be energized under control by said control voltage and having two secondary windings disposed to provide the mutually phase-opposed secondary voltages and each having two end points and a midpoint, an impedance member having two end points and a midpoint, one end point of each of said secondary windings being connected to one of said respective end points of said impedance member and said other winding end points being connected to said other end point of said impedance member, four rectifiers, each being interposed between one of said respective winding end points and the appertaining end point of said impedance member and said four rectifiers being poled for full-wave rectification, another transformer primarily attached to said leads and having a secondary winding with two end points connected to said respective midpoints of said secondary windings of said coupling transformer, said secondary winding of said other transformer having a midpoint connected to said midpoint of said impedance member, a load circuit connected to said leads, a trigger tube series-connected in said load circuit and having a control circuit connected to said impedance member so as to be controlled in response to polarity reversal of said rectified voltage to then energize said load circuit during alternate voltage half-cycles of the alternating current supplied by said leads.

References Cited in the file of this patent

UNITED STATES PATENTS

| Number | Name | Date |
|---|---|---|
| 1,942,587 | Whitman | Jan. 9, 1934 |
| 2,131,759 | Satterlee | Oct. 4, 1938 |
| 2,264,333 | Satterlee | Dec. 2, 1941 |
| 2,275,317 | Ryder | Mar. 3, 1942 |
| 2,419,641 | Hart | Apr. 29, 1947 |
| 2,474,886 | Bovey | July 5, 1949 |

OTHER REFERENCES

"Theory of Servomechanisms," James, Nichols, Phillips; McGraw-Hill Book Co., 1947, pp. 111–114.